US 8,316,636 B2

(12) United States Patent
Nakamura

(10) Patent No.: US 8,316,636 B2
(45) Date of Patent: Nov. 27, 2012

(54) EXHAUST GAS PURIFIER OF CONSTRUCTION MACHINE

(75) Inventor: Kazunori Nakamura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 623 days.

(21) Appl. No.: 12/303,048

(22) PCT Filed: May 31, 2007

(86) PCT No.: PCT/JP2007/061049
§ 371 (c)(1),
(2), (4) Date: Nov. 13, 2009

(87) PCT Pub. No.: WO2007/139177
PCT Pub. Date: Dec. 6, 2007

(65) Prior Publication Data
US 2010/0050601 A1 Mar. 4, 2010

(30) Foreign Application Priority Data

Jun. 1, 2006 (JP) ................................. 2006-153455
Jun. 1, 2006 (JP) ................................. 2006-153457

(51) Int. Cl.
*F01N 3/00* (2006.01)
(52) U.S. Cl. ............................... 60/295; 60/277; 60/286
(58) Field of Classification Search ...................... 60/295
See application file for complete search history.

(56) References Cited

U.S. PATENT DOCUMENTS 6,363,771 B1 * 4/2002 Liang et al. .................. 73/23.31
6,725,651 B2 * 4/2004 Itoh et al. ....................... 60/286

(Continued)

FOREIGN PATENT DOCUMENTS
JP 62-26587 U 2/1987
(Continued)

OTHER PUBLICATIONS

English translation of JP 2002371831A.*

(Continued)

*Primary Examiner* — Thomas Denion
*Assistant Examiner* — Jason Shanske
(74) *Attorney, Agent, or Firm* — Crowell & Moring LLP

(57) ABSTRACT

[PROBLEM] To provide an exhaust gas purification system suitable for a construction machine provided with a hydraulic pump driven by an engine.

[SOLUTION] An exhaust gas purification system is arranged on a hydraulic excavator; and includes an exhaust gas control means for performing treatment to purify nitrogen oxides in exhaust gas emitted from an engine, a urea aqueous solution reservoir for storing urea aqueous solution to be fed to the exhaust gas control means, a remaining amount detection means for detecting a remaining amount of the urea aqueous solution stored in the urea aqueous solution reservoir, a warning lamp capable of turning on when the remaining amount of the urea aqueous solution has decreased to a predetermined amount A, and a pump absorption torque limiting means or engine revolution speed limiting means disposed in a controller to perform a control of an element relating to the operation of the hydraulic actuator, for example, a control to decrease a pump absorption torque or a maximum revolution speed to a predetermined value in a range that an operation of a hydraulic actuator included in a hydraulic drive circuit becomes feasible, as the remaining amount of the urea aqueous solution becomes smaller from the first predetermined amount A.

16 Claims, 10 Drawing Sheets

U.S. PATENT DOCUMENTS

| | | | |
|---|---|---|---|
| 7,207,319 B2* | 4/2007 | Utsumi | 123/446 |
| 2002/0104311 A1* | 8/2002 | Nishiyama | 60/285 |
| 2003/0010214 A1* | 1/2003 | Naruke | 96/337 |
| 2003/0033799 A1* | 2/2003 | Scheying | 60/286 |
| 2005/0155345 A1* | 7/2005 | Nakamura | 60/311 |
| 2006/0037309 A1* | 2/2006 | Funk et al. | 60/286 |

FOREIGN PATENT DOCUMENTS

| | | |
|---|---|---|
| JP | 2-122144 U | 10/1990 |
| JP | 9-32734 A | 2/1997 |
| JP | 09032734 A * | 2/1997 |
| JP | 2002-371831 A | 12/2002 |
| JP | 2002371831 A * | 12/2002 |
| JP | 2003-20936 A | 1/2003 |
| JP | 2005-299436 A | 10/2005 |

OTHER PUBLICATIONS

English translation of JP 09032734A.*
International Search Report dated Sep. 4, 2007 w/English translation (five (5) pages).

* cited by examiner

EXHAUST GAS PURIFIER OF CONSTRUCTION MACHINE

TECHNICAL FIELD

This invention relates to an exhaust gas purification system for a construction machine, which can be arranged on a construction machine such as a hydraulic excavator to purify exhaust gas from an engine that drives a hydraulic pump.

BACKGROUND ART

A construction machine, for example, a hydraulic excavator is provided with an engine and a hydraulic pump driven by the engine, and is torque-controlled such that an absorption torque of the hydraulic pump does not exceed an output torque from the engine. The construction machine is also provided with a hydraulic drive circuit to which pressure oil is fed from the hydraulic pump. This hydraulic drive circuit includes hydraulic equipment such as hydraulic actuators for a boom cylinder, arm cylinder and the like required to drive attachments such as a boom, arm and the like, or hydraulic actuators such as a swing motor and travel motor for driving a swing upperstructure and travel base; and also directional control valves for controlling operations of these hydraulic actuators. With respect to hydraulic excavators having such a construction, there is nowadays an increasing desire for the purification of exhaust gas emitted from engines.

As a conventional technology for purifying exhaust gas, there is the technology disclosed in Patent Document 1. Although this conventional technology is directed to an exhaust gas purification system for arrangement on an automobile different from a construction machine to which the present invention is directed, it includes an exhaust gas control means for performing treatment to purify, with a reducing agent such as urea, nitrogen oxides in exhaust gas emitted from an engine, a reducing agent solution reservoir for storing the reducing agent solution, such as urea aqueous solution, to be fed to the exhaust gas control means, and a liquid level sensor for detecting a remaining amount of the reducing agent solution stored in the reducing agent solution reservoir, that is, a remaining amount detection means. It also includes an alarm that is actuated to give a warning to a driver when the remaining amount of the reducing agent solution stored in the reducing agent solution reservoir has decreased to or below a predetermined amount.

This conventional technology is designed such that, when the remaining amount of the reducing agent solution has decreased to or below the predetermined amount, the alarm is actuated to give a warning to the driver as described above, and further, the engine is controlled at a low output by an engine control unit, and by these warning and control, a replenishment of the reducing agent solution is urged.
Patent Document 1: JP-A-2002-371831

DISCLOSURE OF THE INVENTION

Problem to be Solved by the Invention

The above-described conventional technology disclosed in Patent Document 1 may be effective for the purification of exhaust gas from automobiles, but without modifications, cannot be applied to construction machines such as hydraulic excavators. For example, a hydraulic excavator is provided with a hydraulic pump, which is driven by an engine and feeds pressure oil, which serves to drive a boom, an arm, a swing upperstructure, a travel base and/or the like, to the corresponding hydraulic actuator or actuators, and the relation between an output of the engine and that of the hydraulic pump is important. If, as in the above-mentioned conventional technology, the engine is controlled to a low output when the remaining amount of a reducing agent solution has decreased to or below a predetermined amount, the load on the hydraulic pump may become greater depending on the kind of work to cause an engine stall so that digging work, lifting work or the like, which has been being conducted, may be interrupted.

With the above-mentioned circumstances of the conventional technology in view, an object of the present invention is to provide an exhaust gas purification system suitable for a construction machine provided with a hydraulic pump driven by an engine.

Means for Solving the Problem

To achieve the above-described object, the present invention is characterized in that in an exhaust gas purification system for a construction machine provided with an engine, a hydraulic pump driven by the engine, and a hydraulic drive circuit including plural hydraulic actuators to which pressure oil delivered from the hydraulic pump is fed, the exhaust gas purification system comprises an exhaust gas control means for conducting treatment to purify nitrogen oxides in exhaust gas emitted from the engine; a reducing agent solution reservoir for storing a reducing agent solution fed thereto; a remaining amount detection means for detecting a remaining amount of the reducing agent solution stored in the reducing agent solution reservoir; an alarm means for giving a warning to an effect that a replenishment of the reducing agent solution is required, when the remaining amount of the reducing agent solution as detected by the remaining amount detection means has decreased to a predetermined amount; and a state quantity control means for performing a control to decrease a state quantity relating to a drive of the hydraulic pump to a predetermined value in a range that an operation of the hydraulic actuator becomes feasible, as the remaining amount of the reducing agent solution as detected by the remaining amount detection means becomes smaller from the predetermined amount.

According to the present invention constructed as described above, the reducing agent solution is sufficiently fed to the exhaust gas control means until the remaining amount of the reducing agent solution in the reducing agent solution reservoir decreases to the predetermined amount. As a consequence, nitrogen oxides in exhaust gas emitted from the engine can be purified to emit clean exhaust gas. When the remaining amount of the reducing agent solution in the reducing agent solution reservoir has decreased to the predetermined amount, this decrease is detected by the remaining amount detection means, and a warning is given by the alarm means. Further, the state quantity control means is actuated responsive to the detection by the remaining amount detection means to perform a control of a state quantity relating to a drive of the hydraulic pump, for example, a control to decrease a pump absorption torque, a flow rate of the hydraulic pump or a delivery pressure of the hydraulic pump compared with that at the time of normal working, that is, to a predetermined value in a range that an operation of the hydraulic actuator becomes feasible.

As a consequence, even when the remaining amount of the reducing agent solution in the reducing agent solution reservoir has decreased to or below the predetermined amount, the purification of exhaust gas from the engine can still be continued to emit dean exhaust gas with a load reduced as a result of the decrease in the state quantity relating to the drive of the hydraulic pump. Further, the need for a replenishment of the reducing agent solution is urged by a reduction in working performance in addition to the above-mentioned warning. Furthermore, the work can still be continued, because owing to the control by the state quantity control means, the operation of the hydraulic actuator remains feasible in the limited range although the working performance is reduced as mentioned above.

In the present invention as described above, the state quantity relating to the drive of the hydraulic pump may be a pump absorption torque, and the state quantity detection means may comprise a pump absorption torque control means.

In the present invention as described above, the state quantity relating to the drive of the hydraulic pump may also be a flow rate delivered from the hydraulic pump, and the state quantity detection means may also comprise a flow rate control means.

In the present invention as described above, the state quantity relating to the drive of the hydraulic pump may also be a delivery pressure of the hydraulic pump, and the state quantity detection means may also comprise a delivery pressure control means.

In the present invention as described above, the reducing agent solution may comprise urea aqueous solution.

In the present invention as described above, the alarm means may comprise a warning lamp.

Advantageous Effects of the Invention

The present invention can purify exhaust gas emitted from the engine, because it is provided with the exhaust gas control means for conducting treatment to purify nitrogen oxides in the exhaust gas emitted from the engine that drives the hydraulic pump and also with the reducing agent solution reservoir for storing the reducing agent solution to be fed to the exhaust gas control means. The present invention is also provided with the remaining amount detection means for detecting the remaining amount of the reducing agent solution stored in the reducing agent solution reservoir, with the alarm means for giving a warning to the effect that a replenishment of the reducing agent solution is required, when the remaining amount of the reducing agent solution as detected by the remaining amount detection means has decreased to the predetermined amount, and also with the state quantity control means for performing the control to decrease the state quantity relating to the drive of the hydraulic pump to the predetermined value in the range that the operation of the hydraulic actuator becomes feasible, as the remaining amount of the reducing agent solution as detected by the remaining amount detection means becomes smaller from the predetermined amount. When the remaining amount of the reducing agent solution in the reducing agent solution reservoir has decreased to and below the predetermined amount, the purification of exhaust gas from the engine can, therefore, be still continued with a load reduced as a result of the decrease in the state quantity relating to the drive of the hydraulic pump, and moreover, a warning is given and a reduction takes place in working performance. By these warning and reduction, a replenishment of the reducing agent solution is thus urged. In addition, the work can still be continued without an engine stall although within the limited range. Accordingly, the present invention can realize a system suited for a construction machine.

BEST MODES FOR CARRYING OUT THE INVENTION

With reference to the drawings, a description will hereinafter be made of best modes for carrying out the exhaust gas purification system according to the present invention for the construction machine.

FIG. 1 is a hydraulic circuit diagram illustrating a first embodiment of the exhaust gas purification system according to the present invention for the construction machine, FIG. 2 is a block diagram showing the construction of an essential part of a controller arranged in the first embodiment illustrated in FIG. 1, and FIG. 3 is a diagram depicting characteristics available from the first embodiment of the present invention.

The first embodiment of the present invention as illustrated in FIG. 1 is arranged on a construction machine, for example, a hydraulic excavator. This hydraulic excavator is provided with an engine 1 and a variable displacement hydraulic pump 2 driven by the engine 1, and is torque-controlled such that an absorption torque of the hydraulic pump 2 does not exceed an output torque of the engine 1. The hydraulic excavator is also provided with a revolution speed instructing device 3 for instructing a target revolution speed of the engine 1, a regulator 4 for controlling a displacement of the hydraulic pump 2, a main relief valve 5 for specifying a maximum delivery pressure of the hydraulic pump 2, a revolution control means 6 for controlling a revolution speed of the engine 1, and a controller 7 for outputting to the revolution control means 6 a control signal corresponding to the target revolution speed instructed by the revolution speed instructing device 3 and also for outputting a drive signal to drive the regulator 4.

The exhaust gas purification system is further provided with a hydraulic drive circuit 8 to which pressure oil delivered from the hydraulic pump 2 is fed.

The hydraulic drive circuit 8 includes hydraulic equipment such as hydraulic actuators for a boom cylinder, arm cylinder and the like required to drive attachments such as a boom, arm and the like, or hydraulic actuators such as a swing motor and travel motor for driving a swing upperstructure and travel base; and also directional control valves for controlling operations of these hydraulic actuators.

The exhaust gas purification system according to the first embodiment, which is arranged on such a hydraulic excavator, is provided with an exhaust gas control means 9 for performing treatment to purify nitrogen oxides in exhaust gas emitted from the engine 1, a reducing agent solution reservoir for storing a reducing agent solution, for example, urea aqueous solution to be fed to the exhaust gas control means 9, specifically a urea aqueous solution reservoir 10, and a remaining amount detection means 11 for detecting a remaining amount of the urea aqueous solution stored in the urea aqueous solution reservoir 10.

Also provided is an alarm means, for example, a warning lamp 12 for giving a warning to the effect that a replenishment of the urea aqueous solution is required, when the remaining amount of the urea aqueous solution as detected by the remaining amount detection means 11 has decreased to a first predetermined amount A1 to be mentioned subsequently herein.

As will also be mentioned subsequently herein, still further provided is a state quantity control means, for example, a pump absorption torque control means for performing a control to reduce a state quantity relating to the drive of the hydraulic pump 2, for example, a pump absorption torque to a predetermined value in a range that an operation of a hydraulic actuator included in the above-mentioned hydraulic drive circuit 8 becomes feasible, as the remaining amount of the urea aqueous solution in the urea aqueous solution reservoir 10 as detected by the remaining amount detection means 11 becomes smaller from the first predetermined amount A. This pump absorption torque control means is included in the controller 7.

As shown in FIG. 2, the controller 7 is internally provided with an ON/OFF signal generator unit 7a for outputting an ON signal or OFF signal to the warning lamp 12 responsive to a detection signal outputted from the remaining amount detection means 11. This ON/OFF signal generator unit 7a outputs an OFF signal until the remaining amount in the urea aqueous solution reservoir 10 decreases to the first predetermined amount A, but outputs an ON signal when the remaining amount decreases below the first predetermined amount A.

The controller 7 is also internally provided with a pump absorption torque computing unit 7b for computing a maximum pump absorption torque M of the hydraulic pump 2 that does not exceed an output torque of the engine 1 at the time of normal working.

In particular, the controller 7 is provided with a function generator unit 7c, and a minimum selector unit 7d for selecting smaller one of a signal S1 outputted from the function generator unit 7c and a signal S2 outputted from the above-mentioned pump absorption torque computing unit 7b and outputting the smaller signal as a drive signal to the regulator 4. By these function generator unit 7c and minimum selector unit 7d, a pump absorption torque control means as the above-mentioned state quantity control means is constructed.

The function generator unit 7c is designed to be in a functional relation that it outputs a signal S1, which corresponds to the maximum pump absorption torque M until the remaining amount in the urea aqueous solution reservoir 10 decreases to the first predetermined amount A, outputs a signal S1, the value of which gradually decreases in accordance with a decrease in the remaining amount, when the remaining amount has deceased to and below the first predetermined amount A, and outputs a signal S1, which corresponds to a limited torque m, for example, 70% of the maximum pump absorption torque M when the remaining amount has decreased to and below a second predetermined value B smaller than the first predetermined amount A. It is to be noted that the second predetermined value B, which gives the above-mentioned limited torque m, is a predetermined value in a range that an operation of the hydraulic actuator included in the hydraulic drive circuit 8 becomes feasible.

In the first embodiment constructed as described above, the urea aqueous solution is sufficiently fed to the exhaust gas control means 9 until the remaining amount of the urea aqueous solution in the urea aqueous solution reservoir 10 decreases to the first predetermined amount A. As a consequence, nitrogen oxides in exhaust gas emitted from the engine 1 can be purified to emit dean exhaust gas. During this purification, a detection signal of the remaining amount detection means 11 is inputted to the controller 7, and from the ON/OFF signal generator unit 7a depicted in FIG. 2, an OFF signal is outputted to the warning lamp 12 so that the warning lamp 12 is maintained in an off state. On the other hand, the signal S2 corresponding to the maximum pump absorption torque M is outputted from the function generator unit 7c, and at the minimum selector unit 7d, a drive signal corresponding to the maximum absorption torque M is outputted from the signal S1 and signal S2 to the regulator 4. As a result, the regulator 4 is actuated to control the swash angle of the hydraulic pump 2 such that a maximum pump absorption torque M in a range not exceeding an output torque of the engine 1 is given. A characteristic line 13 in FIG. 3 is a P-Q characteristic line corresponding to the maximum pump absorption torque M at this time.

When the urea aqueous solution in the urea aqueous solution reservoir 10 decreases from the above-mentioned state and the remaining amount of the urea aqueous solution as detected by the remaining amount detection means 11 decreases to the first predetermined amount A, an ON signal is outputted from the ON/OFF signal generator unit 7a of the controller 7 to the warning lamp 12. As a result, the warning lamp 12 is turned on. As the remaining amount of the urea aqueous solution further decreases from the first predetermined amount A, the signal S1 outputted from the function generator unit 7c becomes gradually smaller in value than the maximum pump absorption torque M while the warning lamp 12 remains on. This smaller value is selected at the minimum selector unit 7d, and a drive signal corresponding to the smaller value is outputted to the regulator 4. As a result, the swash angle of the hydraulic pump 2 is controlled to become gradually smaller so that the P-Q characteristic shown in FIG. 3, that is, the pump absorption torque is controlled to become gradually smaller as indicated by an arrow in FIG. 3.

When the remaining amount in the urea aqueous solution reservoir 10 further decreases and the remaining amount detected by the remaining amount detection means 11 decreases to and below the second predetermined amount B, the warning lamp 12 remains on and the signal S1 outputted from the function generator unit 7c takes a value corresponding to the limited torque m. This limited torque m is selected at the minimum selector unit 7d, and a drive signal corresponding to the limited torque m is outputted to the regulator 4. As a result, the swash angle of the hydraulic pump 2 is limited to have a still smaller value so that the P-Q characteristic shown in FIG. 3, specifically the pump absorption torque becomes as shown by a characteristic line 14.

When this state is reached, the time required for a single working cycle such as, for example, work that digs out earth and stones by the hydraulic excavator and loads the dug earth and stones on a dump truck becomes longer compared with that at the time of normal working, resulting in reduced working performance.

Even when the remaining amount of the urea aqueous solution in the urea aqueous solution reservoir 10 has decreased to and below the second predetermined amount B as mentioned above, the purification of exhaust gas from the engine 1 can be continued to emit clean exhaust gas with a load reduced as a result of a decrease in pump absorption torque.

According to the first embodiment, there are provided, as described above, the exhaust gas control means 9 for conducting treatment to purify nitrogen oxides in exhaust gas emitted from the engine 1, which drives the hydraulic pump 2, and the urea aqueous solution reservoir 10 for storing urea aqueous solution to be fed to the exhaust gas control means 9. It is, therefore, possible to purify exhaust gas emitted from the engine 1.

Owing to the provision of the remaining amount detection means 11 for detecting the remaining amount of the urea aqueous solution stored in the urea aqueous solution reservoir 10, the warning lamp 12 for giving a warning to the effect that a replenishment of the urea aqueous solution is required when the remaining amount of the urea aqueous solution as detected by the remaining amount detection means 11 has decreased to the first predetermined amount A, and the function generator unit 7c and minimum selector unit 7d included in the pump absorption torque control means for performing control to decrease the pump absorption torque, which relates to the drive of the hydraulic pump 2, to the predetermined value in the range that the operation of the hydraulic actuator included in the hydraulic drive circuit 8 becomes feasible, specifically to the limited torque m which is, for example, a value of 70% of the maximum pump absorption torque M as the remaining amount of the urea aqueous solution as detected by the remaining amount detection means 11 becomes smaller from the first predetermined amount A, the purification of exhaust gas from the engine 1 can be still continued with a load reduced as a result of a decrease in the state quantity relating to the hydraulic pump 2, specifically the pump absorption load when the remaining amount of the urea aqueous solution in the urea aqueous solution reservoir 10 has decreased to and below the first predetermined amount A.

Concurrently, the warning lamp 12 turns on, and in addition, the working performance is reduced. Therefore, a replenishment of the urea aqueous solution is urged. Further, the work can still be continued without an engine stall although within the limited range. Accordingly, the present invention can realize a system suited for a construction machine.

FIG. 4 is a block diagram showing the construction of an essential part of a controller arranged in a second embodiment of the present invention, and FIG. 5 is a diagram depicting characteristics available from the second embodiment of the present invention.

In addition to an ON/OFF signal generator unit 7a equivalent to that in the first embodiment, the second embodiment of the present invention is provided, in the controller 7, with a pump delivery rate computing unit 7e for computing a delivery rate of the hydraulic pump 2 corresponding to a revolution speed of the engine 1 and outputting a signal S4 corresponding to the computed value, a function generator unit 7f for outputting a signal S3 corresponding to a flow rate which corresponds to a value indicative of a remaining amount of the urea aqueous solution in the urea aqueous solution reservoir 10, and a minimum selector unit 7g for selecting smaller one of the signal S3 outputted from the function generator unit 7f and the signal S4 outputted from the pump delivery rate computing unit 7e.

The above-mentioned function generator unit 7f and minimum selector unit 7g make up a flow rate control means for performing control to decrease a state quantity relating to a drive of the hydraulic pump 2, for example, a flow rate to be delivered from the hydraulic pump 2 to a predetermined value in a range that an operation of the hydraulic actuator included in the hydraulic drive circuit 8 becomes feasible, that is, a state quantity control means, as the remaining amount of the urea aqueous solution as detected by the remaining amount detection means 11 becomes smaller from a predetermined amount.

The function generator unit 7f is designed to be in a functional relation that it outputs a signal S3, which corresponds to a maximum flow rate Q corresponding to a revolution speed of the engine 1 until the remaining amount in the urea aqueous solution reservoir 10 decreases to a first predetermined amount A, outputs a signal S3, the value of which gradually decreases in accordance with a decrease in the remaining amount in the urea aqueous solution reservoir 10, when the remaining amount has deceased to and below the first predetermined amount A, and outputs a signal S3, which corresponds to a limited flow rate q, for example, 70% of the maximum flow rate Q at the time of normal working when the remaining amount in the urea aqueous solution reservoir 10 has decreased to and below a second predetermined amount B smaller than the first predetermined amount A. It is to be noted that the second predetermined amount B, which gives the above-mentioned limited flow rate q, is a predetermined value in a range that an operation of the hydraulic actuator included in the hydraulic drive circuit 8 becomes feasible.

The remaining construction is similar to that of the above-described first embodiment.

In the second embodiment constructed as described above, the urea aqueous solution is sufficiently fed as in the first embodiment until the remaining amount of the urea aqueous solution in the urea aqueous solution reservoir 10 decreases to the first predetermined amount A. Therefore, nitrogen oxides in exhaust gas can be purified to emit dean exhaust gas. Further, the warning lamp 12 is maintained in an off state. Because the signal S3 outputted from the function generator unit 7f and the signal S4 outputted from the pump delivery rate computing unit 7e of the controller 7 take the same value, a drive signal corresponding to the maximum flow rate Q, which corresponds to the revolution speed of the engine 1, is outputted from the minimum selector unit 7g to the regulator 4. As a consequence, the P-Q characteristic line in FIG. 5 becomes a characteristic line 13 as in the above-mentioned first embodiment.

When the urea aqueous solution in the urea aqueous solution reservoir 10 decreases from such a state and the remaining amount of the urea aqueous solution as detected by the remaining amount detection means 11 decreases to the first predetermined amount A, the warning lamp 12 is turned on. As the remaining amount of the urea aqueous solution further decreases from the first predetermined amount A, the signal S3 outputted from the function generator unit 7f becomes gradually smaller in value than the maximum flow rate Q while the warning lamp 12 remains on. This smaller value is selected at the minimum selector unit 7g, and a drive signal corresponding to the smaller value is outputted to the regulator 4. As a result, the P-Q characteristic shown in FIG. 5, that is, the flow rate of the hydraulic pump 2 is controlled to become gradually smaller as indicated by an arrow in FIG. 5.

When the urea aqueous solution in the urea aqueous solution reservoir 10 further decreases to or below the second predetermined amount B, the warning lamp 12 remains on and the signal S3 outputted from the function generator unit 7f takes a value corresponding to the limited flow rate q. A drive signal corresponding to this value is outputted from the minimum selector unit 7g to the regulator 4. As a result, the P-Q characteristic shown in FIG. 5 becomes as shown by a characteristic line 15.

When this state is reached, the maximum flow rate to be fed to the hydraulic actuator included in the hydraulic drive circuit 8 is limited to the limited flow rate q. This develops a situation that the operation speed of the hydraulic actuator becomes slower than that at the time of normal working, leading to a reduction in working performance.

Even when the remaining amount of the urea aqueous solution in the urea aqueous solution reservoir 10 has decreased to and below the second predetermined amount B as mentioned above, the purification of exhaust gas from the engine 1 can be continued to emit dean exhaust gas with a load reduced as a result of a decrease in the flow rate delivered from the hydraulic pump 2.

The second embodiment constructed as described above can also dean exhaust gas emitted from the engine 1 like the above-described first embodiment.

When the remaining amount of the urea aqueous solution as detected by the remaining amount detection means 11 has decreased to or below the first predetermined amount A, the warning lamp 12 is turned on.

When the remaining amount of the urea aqueous solution as detected by the remaining amount detection means 11 decreases to or below the first predetermined amount A, the flow rate to be delivered from the hydraulic pump 2 is limited so that it gradually decreases. Below the second predetermined amount B, the flow rate decreases to the limited flow rate q, that is, 70% of the maximum flow rate Q. The purification of exhaust gas from the engine 1 can be still continued with a load reduced even when the remaining amount of the urea aqueous solution has decreased to or below the second predetermined amount B.

As the warning lamp 12 turns on as mentioned above and in addition, the working performance is reduced, a replenishment of the urea aqueous solution is urged. By feeding pressure oil to the hydraulic actuator, the work can still be continued without an engine stall although within the limited range.

FIG. 6 is a hydraulic circuit diagram illustrating a third embodiment of the present invention, and FIG. 7 is a block diagram showing the construction of an essential part of a controller arranged in the third embodiment of the present invention.

As illustrated in FIG. 6, the third embodiment of the present invention is provided, in addition to the construction of the above-described first embodiment, with a solenoid valve 16 capable of controlling the delivery pressure of the main relief valve 5 and a pilot pump 17 capable of feeding a pilot pressure to the solenoid valve 16.

In addition to an ON/OFF signal generator unit 7 equivalent to that in the first embodiment, the controller 7 is also internally provided with a function generator unit 7h for outputting a signal S5 corresponding to a delivery pressure, which corresponds to a value indicative of the remaining amount of the urea aqueous solution in the urea aqueous solution reservoir 10, and a function generator unit 7i for outputting a current, which corresponds to the signal S5 outputted from the function generator unit 7h, as a drive signal to the solenoid valve 16.

The above-mentioned function generator units 7h,7i, solenoid valve 16 and pilot pump 17 make up a delivery pressure control means for performing control to decrease a state quantity relating to a drive of the hydraulic pump 2, for example, the delivery pressure of pressure oil delivered from the hydraulic pump 2 to a predetermined value in a range that an operation of the hydraulic actuator included in the hydraulic drive circuit 8 becomes feasible, that is, a state quantity control means, as the remaining amount of the urea aqueous solution as detected by the remaining amount detection means 11 becomes smaller from a predetermined amount.

The function generator unit 7h is designed to be in a functional relation that it outputs a signal S5, which corresponds to a preset maximum delivery pressure P at the time of normal working of the hydraulic pump 2 until the remaining amount in the urea aqueous solution reservoir 10 decreases to a first predetermined amount A, outputs a signal S5, the value of which gradually decreases in accordance with a decrease in the remaining amount in the urea aqueous solution reservoir 10, when the remaining amount has deceased to and below the first predetermined amount A, and outputs a signal, which corresponds to a limited delivery pressure Ps, for example, 70% of the maximum delivery pressure P at the time of normal working when the remaining amount in the urea aqueous solution reservoir 10 has decreased to and below a second predetermined amount B smaller than the first predetermined amount A.

It is to be noted that the second predetermined amount B, which gives the above-mentioned limited delivery pressure Ps, is a predetermined value in a range that an operation of the hydraulic actuator included in the hydraulic drive circuit 8 becomes feasible.

Corresponding to the value of the signal 5 outputted from the function generation unit 7h, that is, the delivery pressure, the function generator unit 7i outputs as a drive signal a current in a range of from a maximum current SM to a limited current Sm smaller than the maximum current SM.

The remaining construction is similar to that of the above-described first embodiment.

In the third embodiment constructed as described above, the urea aqueous solution is sufficiently fed as in the first embodiment until the remaining amount of the urea aqueous solution in the urea aqueous solution reservoir 10 decreases to the first predetermined amount A. Therefore, nitrogen oxides in exhaust gas can be purified to emit dean exhaust gas. Further, the warning lamp 12 is maintained in an off state. From the function generator unit 7h of the controller 7, the signal S5 corresponding to the maximum delivery pressure P at the time of normal working is outputted, and responsive to this signal S5, a drive signal corresponding to a maximum current SM is outputted from the function generator unit 7i to the solenoid valve 6. As a consequence, the preset pressure of the main relief valve 5 is maintained at a high pressure preset for the normal work.

When the urea aqueous solution in the urea aqueous solution reservoir 10 decreases from such a state and the remaining amount of the urea aqueous solution as detected by the remaining amount detection means 11 decreases to the first predetermined amount A, the warning lamp 12 is turned on. As the remaining amount of the urea aqueous solution further decreases from the first predetermined amount A, the signal S5 outputted from the function generator unit 7h becomes gradually smaller in value than the maximum delivery pressure P while the warning lamp 12 remains on. Responsive to this smaller value, a drive signal corresponding to a current smaller than the maximum current SM is outputted from the function generator unit 7i to the solenoid valve 16. As a result, the solenoid valve 16 is actuated to apply the pilot pressure of the pilot pump 17 to the control portion of the main relief valve 5 via the solenoid valve 16, and the main relief valve 5 is controlled such that its preset pressure becomes gradually lower than the maximum delivery pressure P.

When the urea aqueous solution in the urea aqueous solution reservoir 10 further decreases to or below the second predetermined amount B, the warning lamp 12 remains on and the signal S5 outputted from the function generator unit 7h takes a value corresponding to the limited delivery pressure s. A drive signal corresponding to the limited current Sm, which corresponds to this value, is outputted from the function generator unit 7i to the solenoid valve 16. The preset pressure of the main relief valve 5 is, therefore, becomes the limited delivery pressure Ps by a pilot pressure fed through the solenoid valve 16.

When this state is reached, no maximum force can be produced upon operation of the hydraulic actuator included in the hydraulic drive circuit 8, thereby developing, for example, a situation such that digging of a hard ground can no longer be performed although it was feasible at the time of normal working, and hence leading to a reduction in working performance Even when the remaining amount of the urea aqueous solution in the urea aqueous solution reservoir 10 has decreased to and below the second predetermined amount B as mentioned above, the purification of exhaust gas from the engine 1 can be continued to emit clean exhaust gas with a load reduced as a result of a decrease in the maximum delivery pressure of pressure oil delivered from the hydraulic pump 2.

This embodiment constructed as described above can also clean exhaust gas emitted from the engine 1 like the above-described first embodiment.

When the remaining amount of the urea aqueous solution as detected by the remaining amount detection means 11 has decreased to or below the first predetermined amount A, the warning lamp 12 is turned on as in the first embodiment.

When the remaining amount of the urea aqueous solution as detected by the remaining amount detection means 11 decreases to or below the first predetermined amount A, the delivery pressure of the hydraulic pump 2 gradually decreases from the maximum delivery pressure Pm, and below the second predetermined amount B, the delivery pressure decreases to the limited delivery pressure Ps, that is, 70% of the maximum delivery pressure P. The purification of exhaust gas from the engine 1 can be still continued with a load reduced even when the remaining amount of the urea aqueous solution has decreased to or below the second predetermined amount B.

As the warning lamp 12 turns on as mentioned above and in addition, the working performance is reduced, a replenishment of the urea aqueous solution is also urged in this third embodiment. By feeding pressure oil to the hydraulic actuator, the work can still be continued without an engine stall although within the limited range.

In addition to the above-described embodiments, it is also possible to control an element relating to the operation of the hydraulic actuator, especially the revolution speed of the engine.

A description will now be made about an exhaust gas purification system designed to limit the maximum revolution speed of an engine such that, when a reducing agent solution has become smaller than a predetermined amount as described above, the maximum revolution speed is gradually reduced to a predetermined value in a range that an operation of the hydraulic actuator becomes feasible.

This exhaust gas purification system is characterized in that it is arranged on a construction machine provided with an engine, a hydraulic pump driven by the engine, and a hydraulic drive circuit including plural hydraulic actuators to which pressure oil delivered from the hydraulic pump is fed and that it comprises an exhaust gas control means for conducting treatment to purify nitrogen oxides in exhaust gas emitted from the engine, a reducing agent solution reservoir for storing a reducing agent solution to be fed to the exhaust gas control means, a remaining amount detection means for detecting a remaining amount of the reducing agent solution stored in the reducing agent solution reservoir, an alarm means for giving a warning to an effect that a replenishment of the reducing agent solution is required, when the remaining amount of the reducing agent solution as detected by the remaining amount detection means has decreased to a predetermined amount, and an engine revolution speed limiting means for limiting a maximum revolution speed of the engine such that, when the remaining amount of the reducing agent solution as detected by the remaining amount detection means has become smaller from the predetermined amount, it is gradually reduced in accordance with the decrease in the remaining amount to a predetermined value in a range that an operation of the hydraulic actuator becomes feasible.

By constructing as described above, the reducing agent solution is sufficiently fed to the exhaust gas control means until the remaining amount of the reducing agent solution in the reducing agent solution reservoir decreases to the predetermined amount. As a consequence, nitrogen oxides in exhaust gas emitted from the engine can be purified to emit clean exhaust gas. When the remaining amount of the reducing agent solution in the reducing agent solution reservoir has decreased to the predetermined amount, this decrease is detected by the remaining amount detection means, and a warning is given by the alarm means. Further, the engine revolution speed limiting means is actuated responsive to the detection by the remaining amount detection means to perform a control that gradually reduces the maximum revolution speed of the engine compared with that at the time of normal working, that is, a control that reduces the maximum revolution speed of the engine to a predetermined value in a range that an operation of the hydraulic actuator becomes feasible.

As a consequence, even when the remaining amount of the reducing agent solution in the reducing agent solution reservoir has decreased to or below the predetermined amount, the purification of exhaust gas from the engine can still be continued to emit clean exhaust gas with a load reduced as a result of the reduction of the maximum revolution speed of the engine. Further, the need for a replenishment of the reducing agent solution is urged by a reduction in working performance in addition to the above-mentioned warning. Furthermore, the work can still be continued, because owing to the control by the engine revolution speed control means, the performance of the work is gradually reduced in accordance with the decrease in the remaining amount of the reducing agent solution and an abrupt fluctuation in the work can hence be inhibited, and the operation of the hydraulic actuator remains feasible in the limited range, although the working performance is reduced as mentioned above.

In the above-described purification system, the reducing agent solution may comprise urea aqueous solution.

In the above-described purification system, the alarm means may comprise a warning lamp.

The present invention can purify exhaust gas emitted from the engine, because it is provided with the exhaust gas control means for conducting treatment to purify nitrogen oxides in the exhaust gas emitted from the engine that drives the hydraulic pump and also with the reducing agent solution reservoir for storing the reducing agent solution to be fed to the exhaust gas control means. The present invention is also provided with the remaining amount detection means for detecting the remaining amount of the reducing agent solution stored in the reducing agent solution reservoir, with the alarm means for giving a warning to the effect that a replenishment of the reducing agent solution is required, when the remaining amount of the reducing agent solution as detected by the remaining amount detection means has decreased to the predetermined amount, and also with the engine revolution speed limiting means for limiting the maximum revolution speed of the engine such that, when the remaining amount of the reducing agent solution as detected by the remaining amount detection means has become smaller from the predetermined amount, it is gradually reduced in accordance with the decrease in the remaining amount to the predetermined value in the range that an operation of the hydraulic actuator becomes feasible. When the remaining amount of the reducing agent solution in the reducing agent solution reservoir has decreased to and below the predetermined amount, the purification of exhaust gas from the engine can, therefore, be still continued with a load reduced as a result of the reduction in the maximum revolution speed of the engine, and moreover, a warning is given and a reduction takes place in working performance. By these warning and reduction, a replenishment of the reducing agent solution is thus urged. In addition, the working performance can be gradually reduced in accordance with the decrease in the remaining amount of the reducing agent solution, an abrupt fluctuation in the work can be inhibited. Therefore, the work can still be continued although within the limited range. Accordingly, the present invention can realize a system suited for a construction machine.

A practical mode will hereinafter be described with reference to the drawings.

FIG. 81 is a hydraulic circuit diagram illustrating a still further embodiment of the exhaust gas purification system according to the present invention for the construction machine, and FIG. 9 is a block diagram showing the construction of an essential part of a controller arranged in the still further embodiment illustrated in FIG. 8.

The still further embodiment of the present invention as illustrated in FIG. 8 is arranged on a construction machine, for example, a hydraulic excavator. This hydraulic excavator is provided with an engine 101 and a variable displacement hydraulic pump 102 driven by the engine 101, and is torque-controlled such that an absorption torque of the hydraulic pump 102 does not exceed an output torque of the engine 101. The hydraulic excavator is also provided with a revolution speed instructing device 103 for instructing a target revolution speed of the engine 101, a regulator 104 for controlling a displacement of the hydraulic pump 102, a main relief valve 105 for specifying a maximum delivery pressure of the hydraulic pump 102, a revolution control means 106 for controlling a revolution speed of the engine 101, and a controller 107 for outputting to the revolution control means 106 a control signal corresponding to the target revolution speed instructed by the revolution speed instructing device 103 and also for outputting a drive signal to drive the regulator 104.

The exhaust gas purification system is further provided with a hydraulic drive circuit 108 to which pressure oil delivered from the hydraulic pump 102 is fed. This hydraulic drive circuit 108 includes hydraulic equipment such as hydraulic actuators for a boom cylinder, arm cylinder and the like required to drive attachments such as a boom, arm and the like, or hydraulic actuators such as a swing motor and travel motor for driving a swing upperstructure and travel base; and also directional control valves for controlling operations of these hydraulic actuators.

The exhaust gas purification system according to this embodiment, which is arranged on such a hydraulic excavator, is provided with an exhaust gas control means 109 for performing treatment to purify nitrogen oxides in exhaust gas emitted from the engine 101, a reducing agent solution reservoir for storing a reducing agent solution, for example, urea aqueous solution to be fed to the exhaust gas control means 109, specifically a urea aqueous solution reservoir 110, and a remaining amount detection means 111 for detecting a remaining amount of the urea aqueous solution stored in the urea aqueous solution reservoir 110.

Also provided is an alarm means, for example, an warning lamp 112 for giving a warning to the effect that a replenishment of the urea aqueous solution is required, when the remaining amount of the urea aqueous solution as detected by the remaining amount detection means 111 has decreased to a first predetermined amount A1 to be mentioned subsequently herein.

As will also be mentioned subsequently herein, still further provided is an engine revolution speed limiting means for limiting a maximum revolution speed of the engine 101 such that, when the remaining amount of the reducing agent solution in the urea aqueous solution reservoir 110 as detected by the remaining amount detection means 111 has become smaller from the predetermined first amount A, it is reduced in accordance with the decrease in the remaining amount to a predetermined value in a range that an operation of the above-mentioned hydraulic actuator included in the hydraulic drive circuit 108 becomes feasible. This engine revolution speed limiting means is included in the controller 107.

As shown in FIG. 9, the controller 7 is internally provided with an ON/OFF signal generator unit 107a for outputting an ON signal or OFF signal to the warning lamp 112 responsive to a detection signal outputted from the remaining amount detection means 111. This ON/OFF signal generator unit 107a outputs an OFF signal until the remaining amount in the urea aqueous solution reservoir 110 decreases to the first predetermined amount A, but outputs an ON signal when the remaining amount decreases below the first predetermined amount A.

The controller 107 is also internally provided with an engine revolution speed computing unit 107b for controlling the maximum revolution speed of the engine 101 to a target revolution speed instructed by the revolution speed instructing unit 103 in normal working.

In particular, the controller 107 is provided with a function generator unit 107c, and a minimum selector unit 107d for selecting smaller one of a signal S1 outputted from the function generator unit 107c and a signal S2 outputted from the above-mentioned engine revolution speed computing unit 107b and outputting the smaller signal as a drive signal to the regulator 104. By these function generator unit 107c and minimum selector unit 107d, an engine revolution number limiting means is constructed.

The function generator unit 107c is designed to be in a functional relation that it outputs a signal S1, which corresponds to the maximum revolution speed N of the engine 101 in normal time until the remaining amount in the urea aqueous solution reservoir 110 decreases to the first predetermined amount A, outputs a signal S1 which, when the remaining amount has deceased to and below the first predetermined amount A, gradually reduces the maximum revolution speed of the engine 101 in accordance with the decrease in the remaining amount, and outputs a signal S1, which corresponds to a limited revolution speed n, for example, 70% of the maximum revolution speed N of the engine 101 in normal working when the remaining amount has decreased to and below a second predetermined value B smaller than the first predetermined amount A. It is to be noted that the second predetermined amount B, which gives the above-mentioned limited revolution speed n, is a predetermined value in a range that an operation of the hydraulic actuator included in the hydraulic drive circuit 108 becomes feasible.

In the this embodiment constructed as described above, the urea aqueous solution is sufficiently fed to the exhaust gas control means 109 until the remaining amount of the urea aqueous solution in the urea aqueous solution reservoir 110 decreases to the first predetermined amount A. As a consequence, nitrogen oxides in exhaust gas emitted from the engine 101 can be purified to emit clean exhaust gas. During this purification, a detection signal of the remaining amount detection means 111 is inputted to the controller 107, and from the ON/OFF signal generator unit 107a depicted in FIG. 2, an OFF signal is outputted to the warning lamp 112 so that the warning lamp 112 is maintained in an off state. On the other hand, the signal S2 corresponding to the maximum revolution speed N is outputted from the function generator unit 107c, and at the minimum selector unit 107d, a drive signal corresponding, for example, to the maximum revolution speed N of the engine 101 is outputted from the signal S1 and signal S2 to the regulator 104. As a result, the regulator 104 is actuated to control the swash angle of the hydraulic pump 102 such that a maximum pump absorption torque in a range not exceeding an output torque of the engine 101 is given.

When the urea aqueous solution in the urea aqueous solution reservoir 110 decreases from the above-mentioned state and the remaining amount of the urea aqueous solution as detected by the remaining amount detection means 111 decreases to the first predetermined amount A, an ON signal is outputted from the ON/OFF signal generator unit 107a of the controller 7 to the warning lamp 112. As a result, the warning lamp 112 is turned on. As the remaining amount of the urea aqueous solution further decreases from the first predetermined amount A, the signal S1 outputted from the function generator unit 107c becomes gradually lower in value than the maximum revolution speed N of the engine 101 in normal working while the warning lamp 112 remains on. For example, this lower revolution speed is selected at the minimum selector unit 107d, and a drive signal corresponding to the lower revolution speed is outputted to the regulator 104. As a result, the swash angle of the hydraulic pump 102 is controlled to become gradually smaller so that the flow rate of pressure oil delivered from the hydraulic pump 102 gradually decreases.

When the remaining amount in the urea aqueous solution reservoir 110 further decreases and the remaining amount detected by the remaining amount detection means 111 decreases to and below the second predetermined amount B, the warning lamp 112 remains on and the signal S1 outputted from the function generator unit 107c takes a value corresponding to the limited revolution speed n. This limited revolution speed n is selected at the minimum selector unit 107d, and a drive signal corresponding to the limited revolution speed n is outputted to the regulator 104. As a result, the swash angle of the hydraulic pump 102 is limited to have a still smaller value so that the flow rate of pressure oil delivered from the hydraulic pump 102 decreases. When this state is reached, the operation speed of the hydraulic actuator becomes slower compared with that at the time of normal working, resulting in reduced working performance.

Even when the remaining amount of the urea aqueous solution in the urea aqueous solution reservoir 110 has decreased to and below the second predetermined amount B as mentioned above, the purification of exhaust gas from the engine 101 can be continued to emit dean exhaust gas with a load reduced as a result of a reduction in the maximum revolution speed of the engine 101.

According to this embodiment, there are provided, as described above, the exhaust gas control means 109 for conducting treatment to purify nitrogen oxides in exhaust gas emitted from the engine 101, which drives the hydraulic pump 101, and the urea aqueous solution reservoir 110 for storing urea aqueous solution to be fed to the exhaust gas control means 109. It is, therefore, possible to purify exhaust gas emitted from the engine 101.

Owing to the provision of the remaining amount detection means 111 for detecting the remaining amount of the urea aqueous solution stored in the urea aqueous solution reservoir 110, the warning lamp 112 for giving a warning to the effect that a replenishment of the urea aqueous solution is required when the remaining amount of the urea aqueous solution as detected by the remaining amount detection means 111 has decreased to the first predetermined amount A, and the function generator unit 107c and minimum selector unit 107d included in the engine revolution speed control means for performing control to gradually decrease the maximum revolution speed of the engine 101 to the predetermined value in the range that the operation of the hydraulic actuator included in the hydraulic drive circuit 108 becomes feasible, specifically to the limited revolution speed n which is, for example, a value of 70% of the maximum revolution speed N of the engine 101 at the time of normal working as the remaining amount of the urea aqueous solution as detected by the remaining amount detection means 111 becomes smaller from the first predetermined amount A, the purification of exhaust gas from the engine 1 can be still continued with a load reduced as a result of a reduction in the maximum revolution speed of the engine 101 when the remaining amount of the urea aqueous solution in the urea aqueous solution reservoir 110 has decreased to and below the first predetermined amount A.

As the warning lamp 112 also turns on and in addition, the working performance is also reduced, a replenishment of the urea aqueous solution is urged. In addition, the working performance can be gradually reduced in accordance with the decrease in the remaining amount of the urea aqueous solution, an abrupt fluctuation in the work can be inhibited. Therefore, the work can still be continued although within the limited range. Accordingly, the present invention can realize a system suited for this hydraulic excavator.

FIG. 10 is a diagram depicting a function generator unit included in a yet further embodiment of the present invention.

This yet further embodiment is different from the above-described still further embodiment in the setting of a function at a function generator unit 107c included in a controller 107 and constituting the engine revolution speed limiting means. The remaining construction is equivalent to that in the above-described still further embodiment.

The function generator unit 107c in the controller 107 arranged in the yet further embodiment depicted in FIG. 10 is set in a functional relation that the maximum revolution speed of the engine 101 is set at the maximum revolution speed N for normal working until the remaining amount of the urea aqueous solution decreases to the first predetermined amount A; that, when the remaining amount becomes the first predetermined amount A, the maximum speed is gradually reduced to n1 in accordance with the decrease in the remaining amount until the remaining amount decreases to a predetermined amount C1; that the above-mentioned maximum speed n1 is maintained while the remaining amount decreases from the predetermined amount C1 to another predetermined amount C2; that, while the remaining amount decreases from the predetermined amount C2 to a second predetermined amount B, the maximum revolution speed is gradually reduced to a limited revolution speed n in accordance with the decrease in the remaining amount; and that, when the remaining amount decreases to and below the second predetermined amount B, the limited revolution speed n is maintained. Described specifically, the maximum revolution number is set in a functional relation that, as the remaining amount of the urea aqueous solution decreases, the maximum revolution speed is gradually reduced stepwise from the maximum revolution number N for normal working to the limited revolution number n which is, for example, a value of 70% of the maximum revolution speed N.

The yet further embodiment, which is provided with the controller 107 having the function generator unit 107c of the functional relation set as described above, can also bring about similar advantageous effects as the above-described embodiments, because it is designed such that, as the remaining amount of the urea aqueous solution decreases, the maximum revolution speed of the engine 101 is gradually reduced in accordance with the remaining amount within the range

LEGEND

Figure 1:
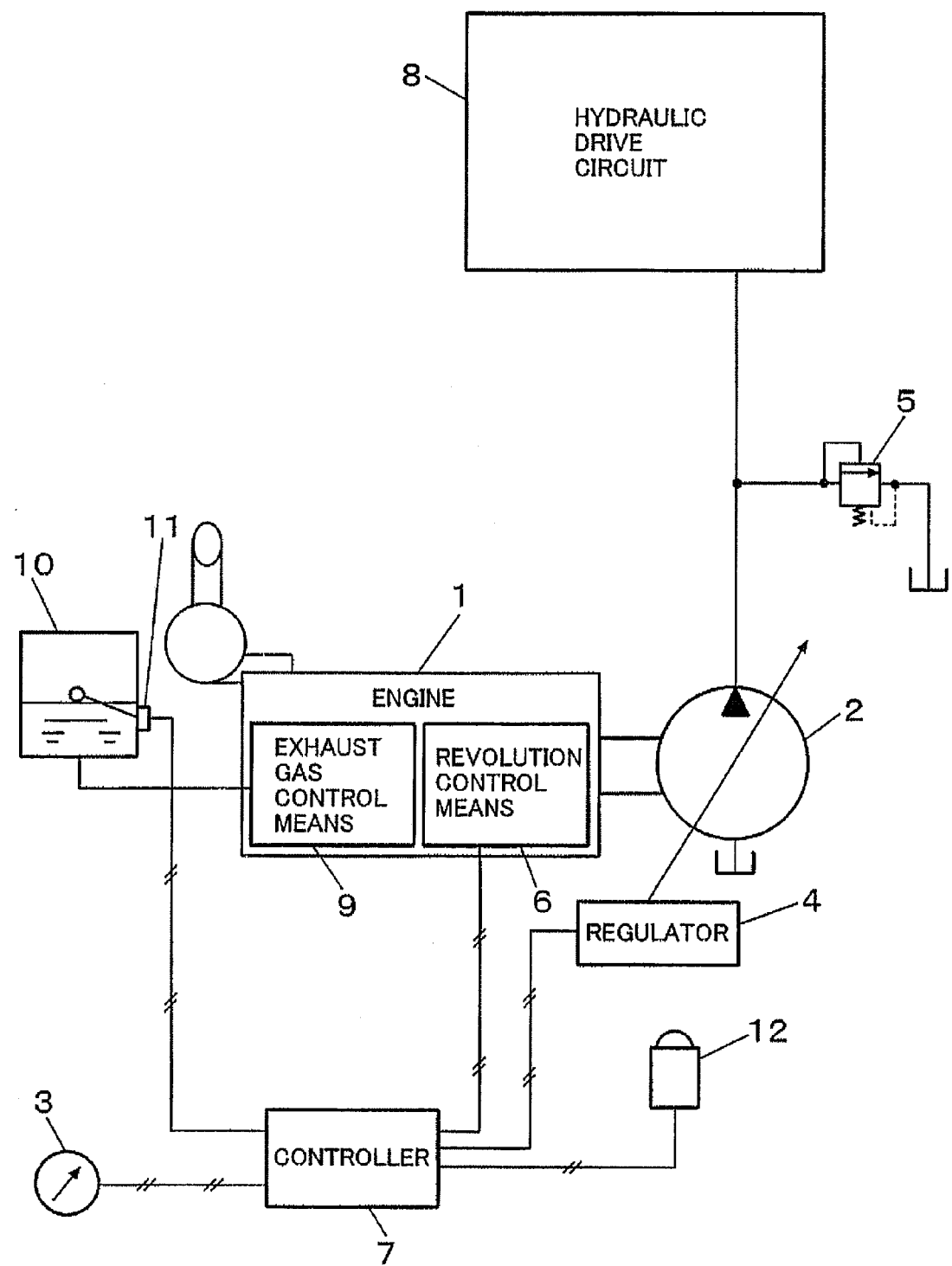
FIG. 1 A hydraulic circuit diagram illustrating a first embodiment of an exhaust gas purification system according to the present invention for a construction machine.
Figure 2:
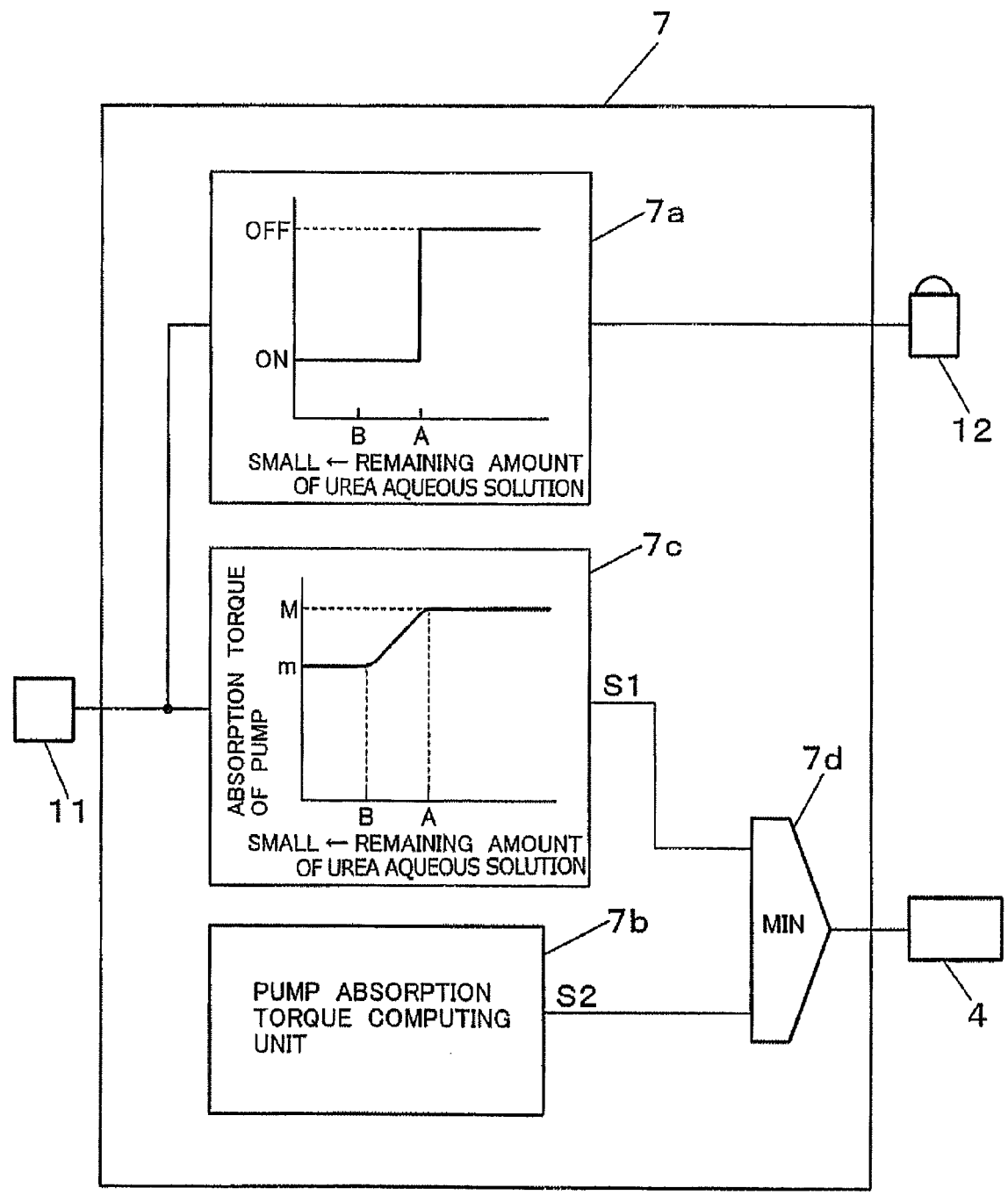
FIG. 2 A block diagram showing the construction of an essential part of a controller arranged in the first embodiment illustrated in FIG. 1.
Figure 3:
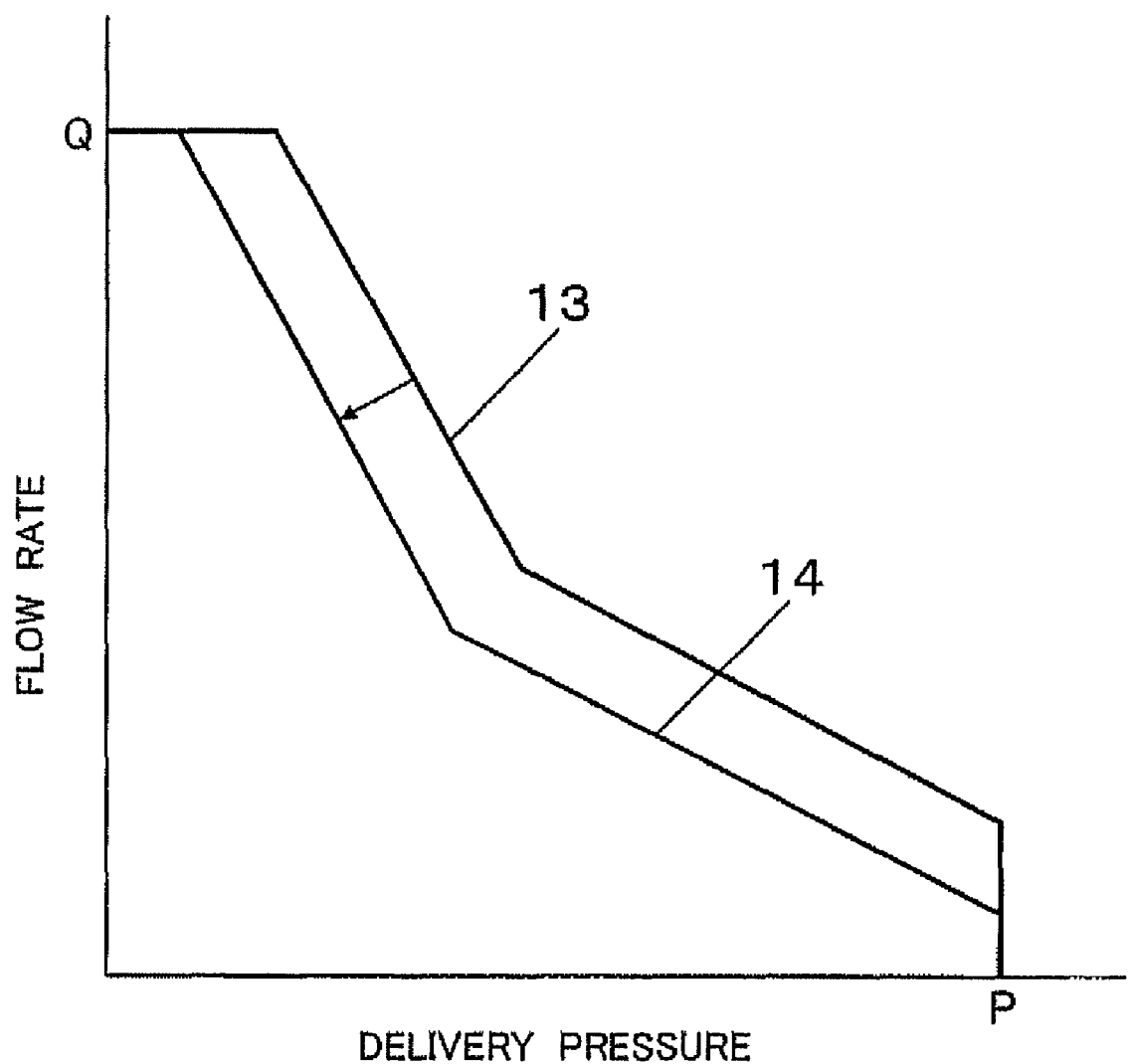
FIG. 3 A diagram depicting characteristics available from the first embodiment of the present invention.
Figure 4:
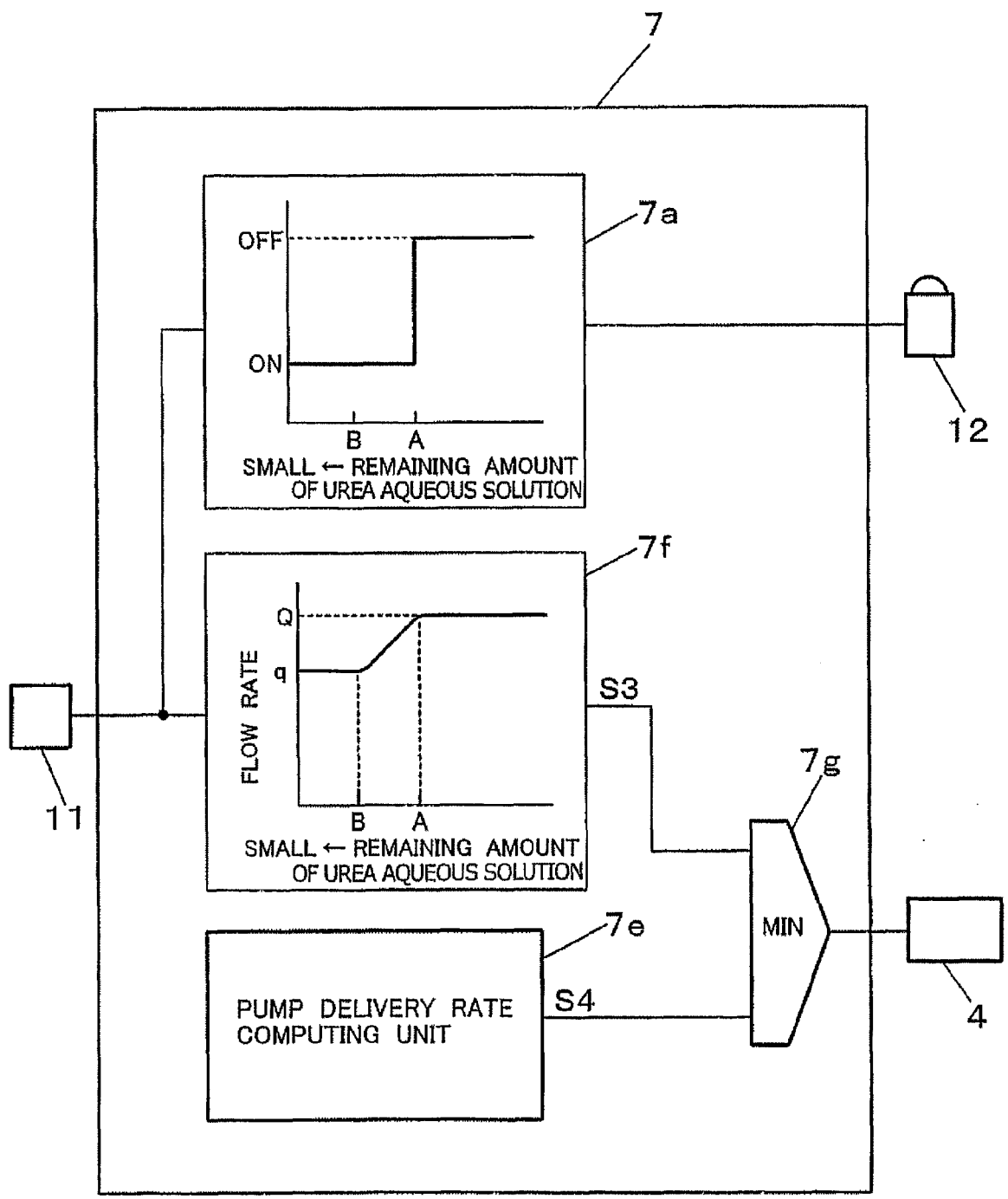
FIG. 4 A block diagram showing the construction of an essential part of a controller arranged in a second embodiment of the present invention.
Figure 5:
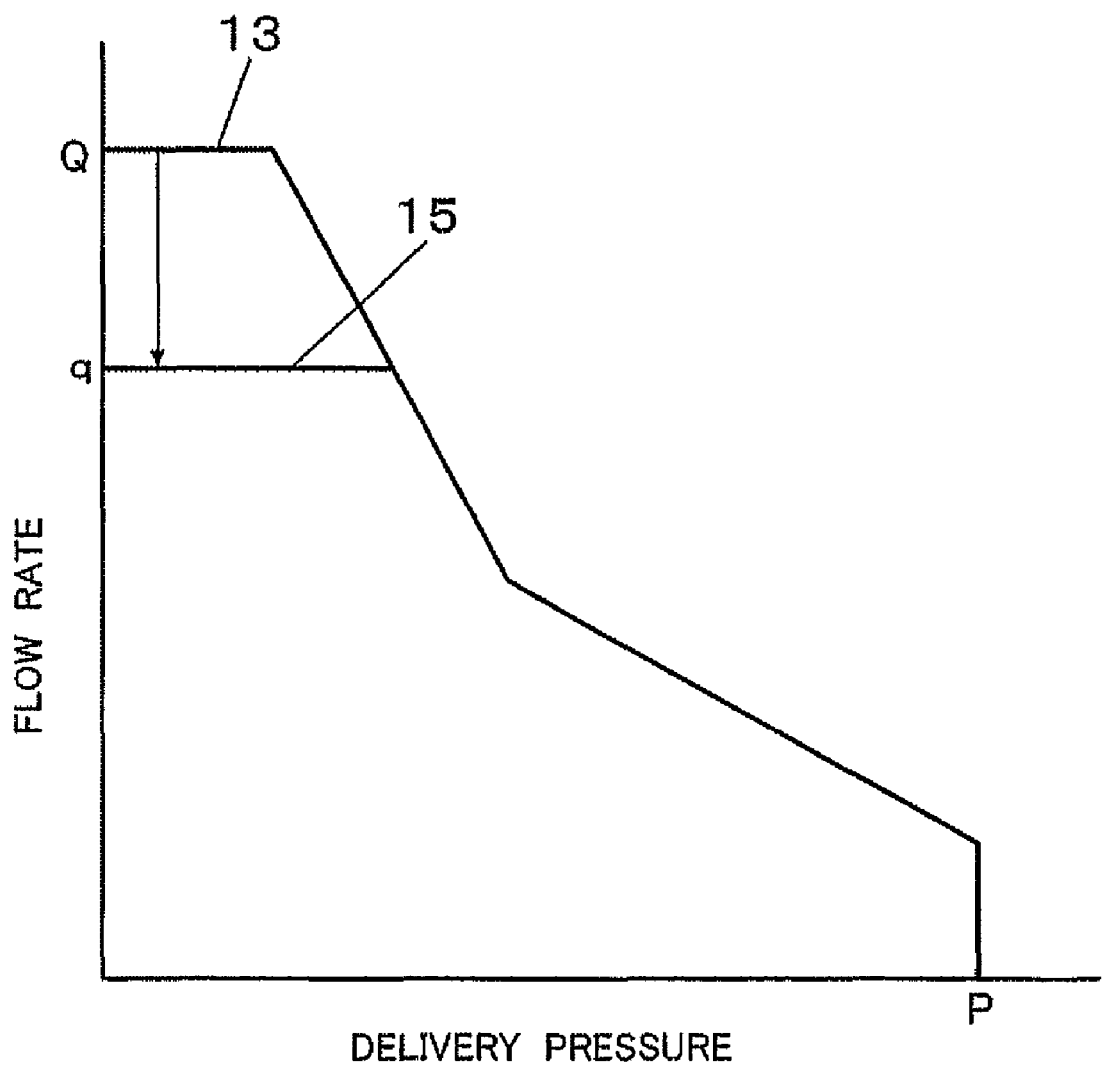
FIG. 5 A diagram depicting characteristics available from the second embodiment of the present invention.
Figure 6:
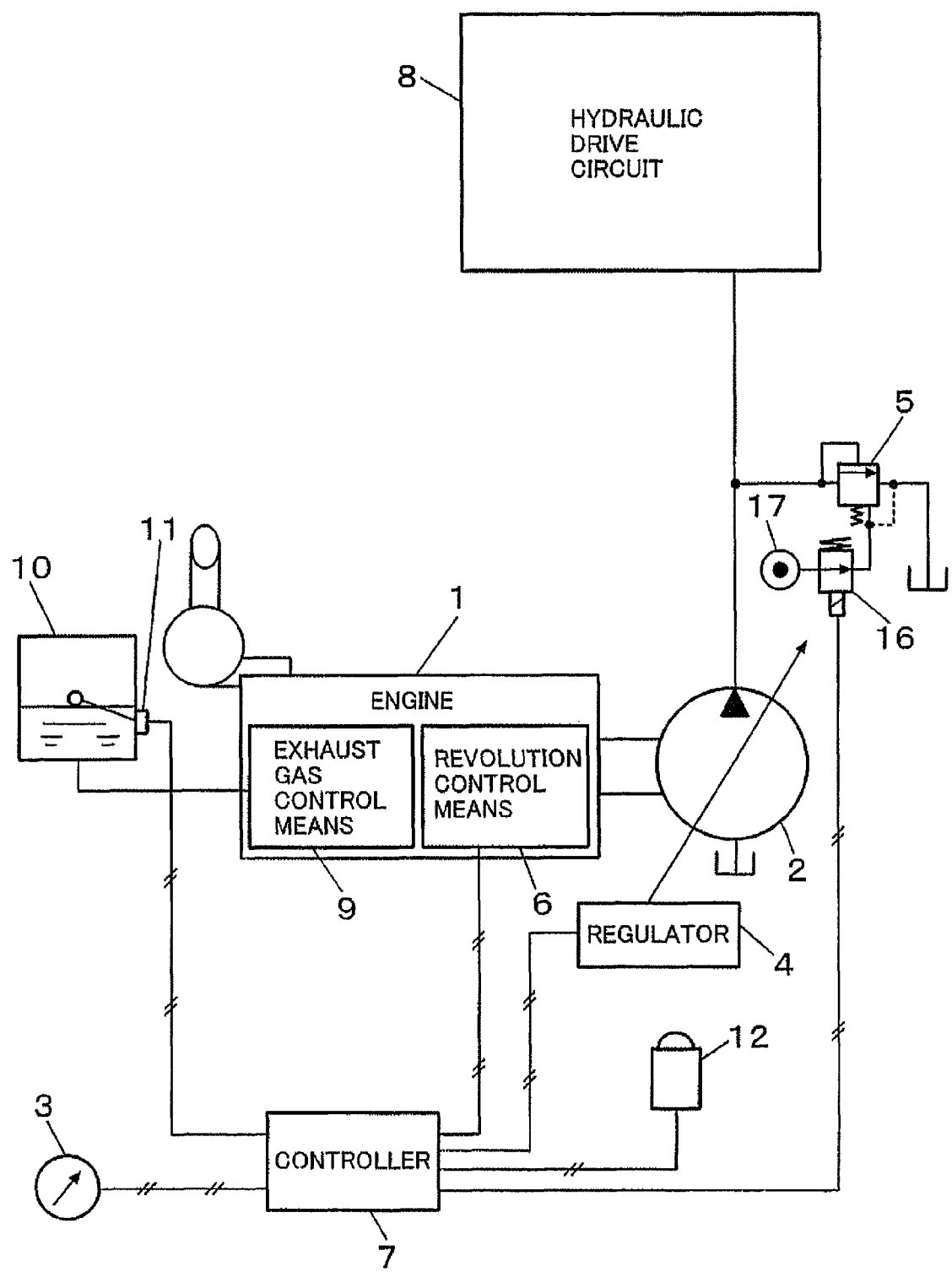
FIG. 6 A hydraulic circuit diagram illustrating a third embodiment of the present invention.
Figure 7:
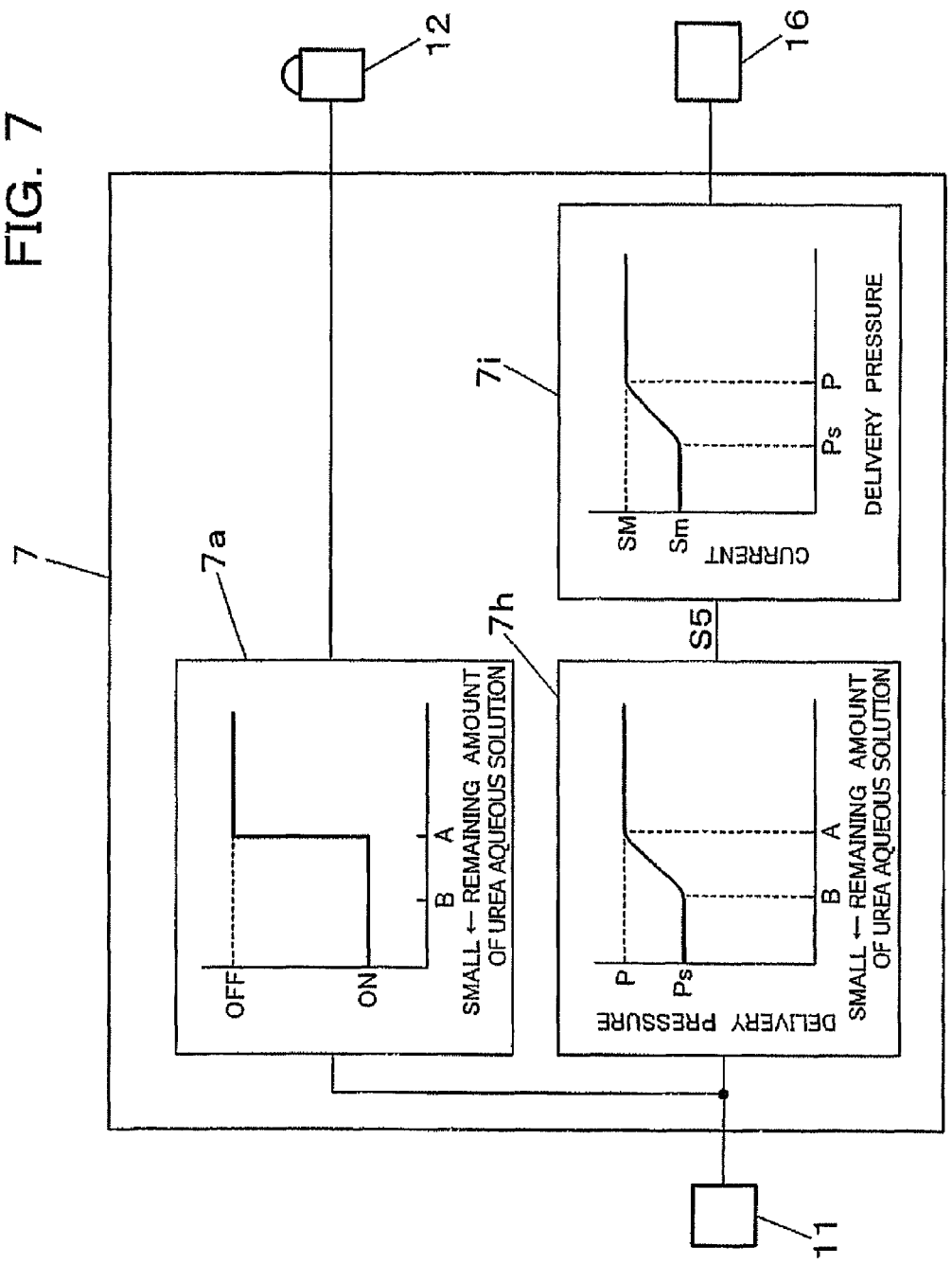
FIG. 7 A block diagram showing the construction of an essential part of a controller arranged in the third embodiment of the present invention.
Figure 8:
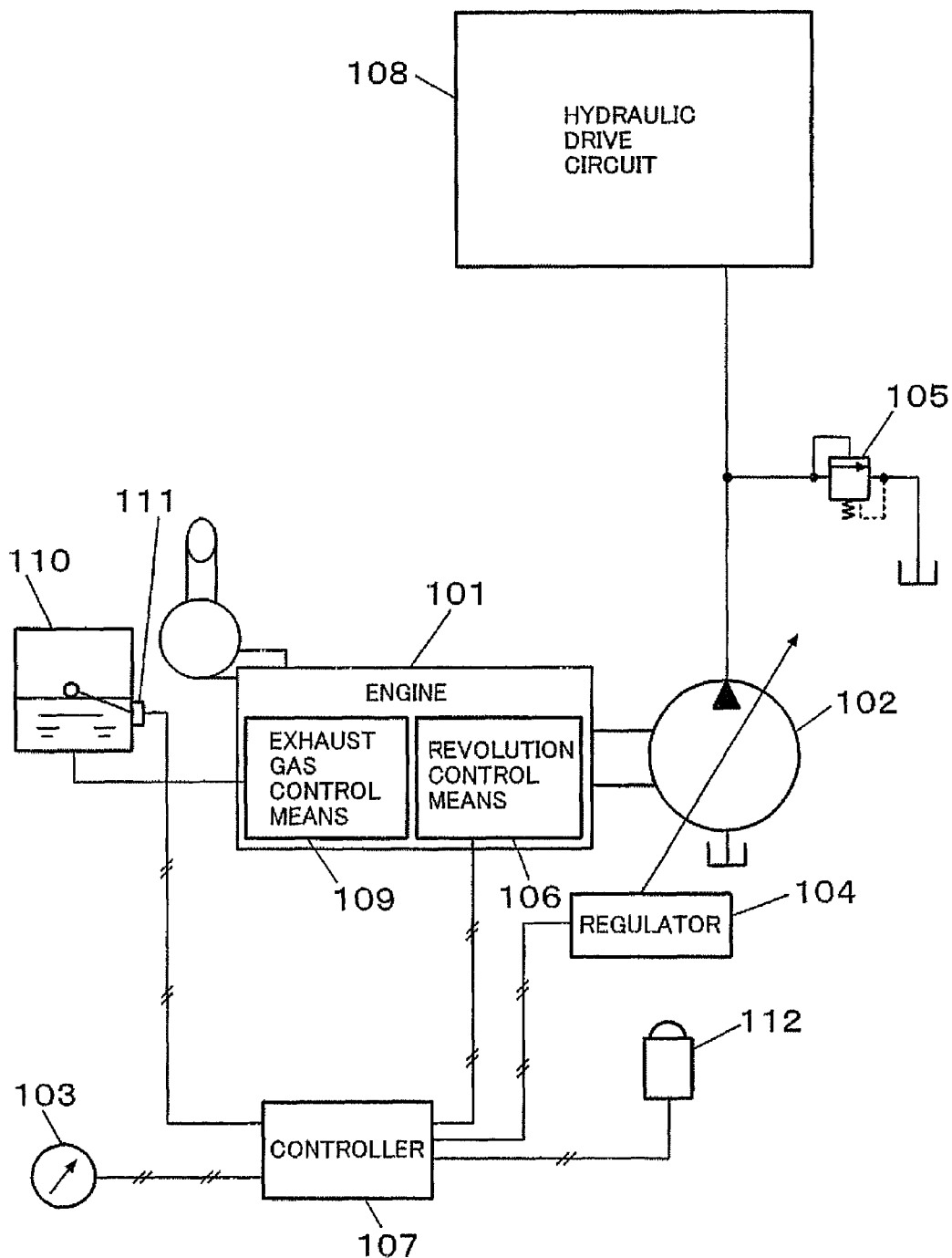
FIG. 8 A hydraulic circuit diagram illustrating a still further embodiment of the exhaust gas purification system according to the present invention for the construction machine.
Figure 9:
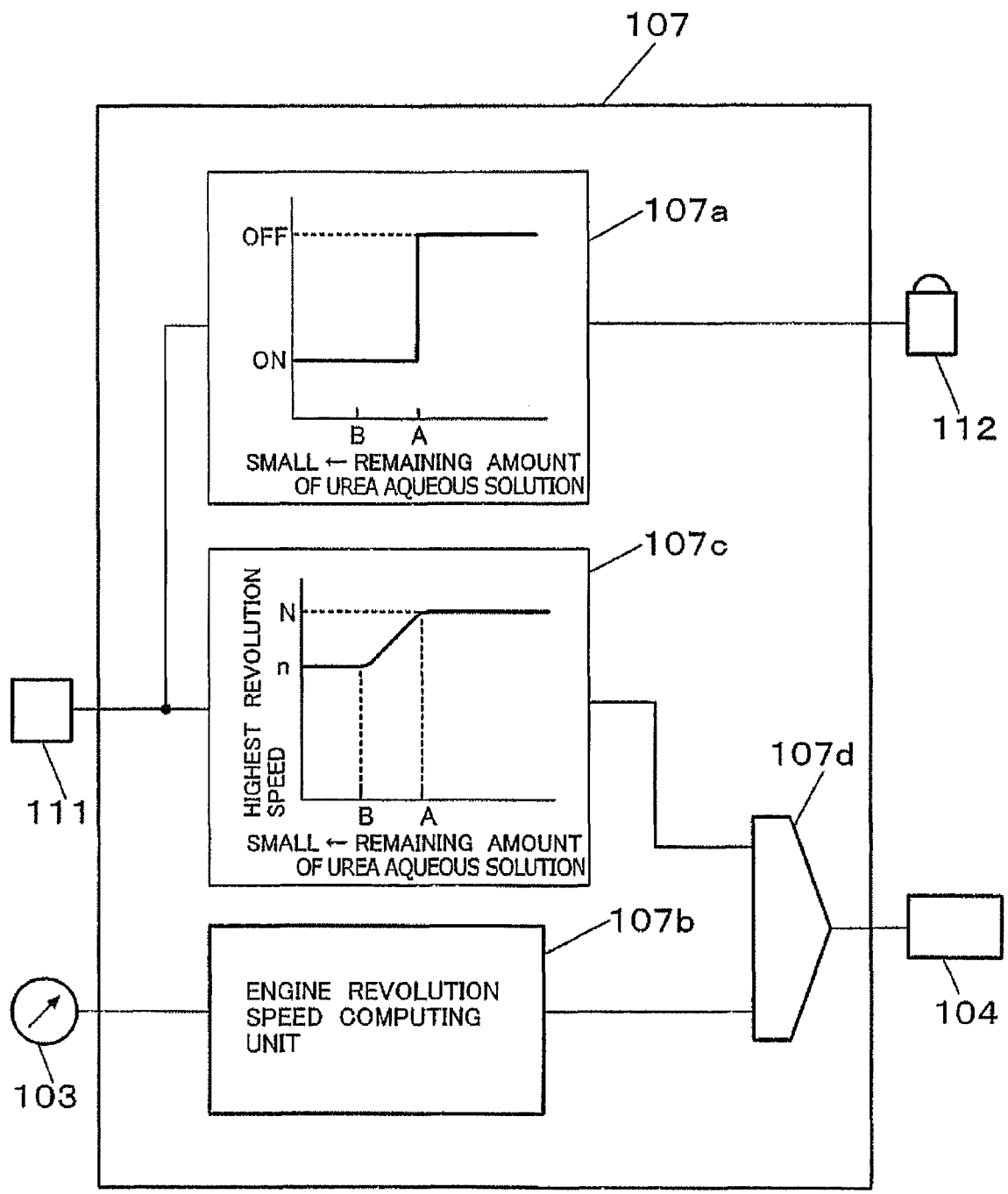
FIG. 9 A block diagram showing the construction of an essential part of a controller arranged in the still further embodiment illustrated in FIG. 8.
Figure 10:
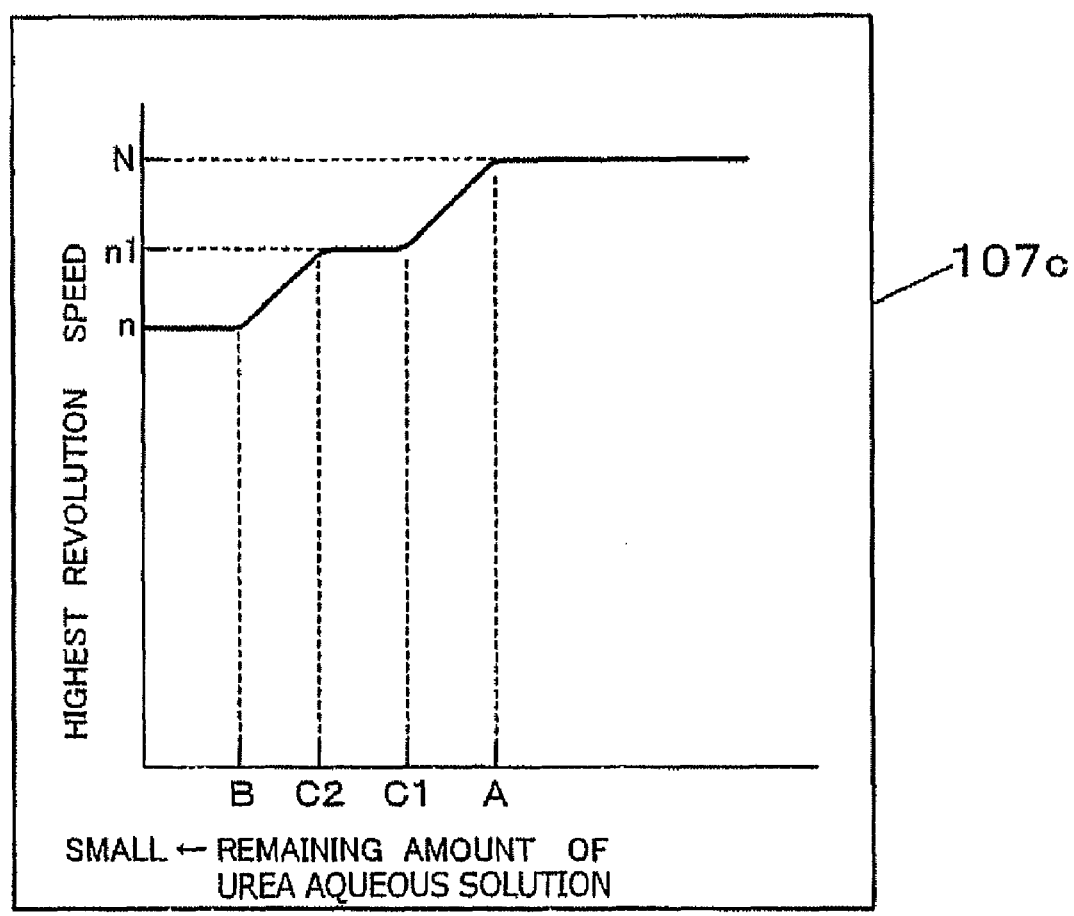
FIG. 10 A diagram depicting a function regenerator unit included in a controller arranged in a yet further embodiment of the present invention.

| | |
|---|---|
| 1 | Engine |
| 2 | Variable-displacement hydraulic pump |
| 3 | Revolution speed instructing device |
| 4 | Regulator |
| 5 | Main relief valve |
| 6 | Revolution control means |
| 7 | Controller |
| 7a | ON/OFF signal generator unit |
| 7b | Pump absorption torque computing unit |
| 7c | Function generator unit (pump absorption torque control means)[state quantity control means] |
| 7d | Minimum selector unit (pump absorption torque control means)[state quantity control means] |
| 7e | Pump delivery rate computing unit |
| 7f | Function generator unit (flow rate control means) [state quantity control means] |
| 7g | Minimum selector unit (flow rate control means) [state quantity control means] |
| 7h | Function generator unit (delivery pressure control means) [state quantity control means] |
| 7i | Function generator unit (delivery pressure control means) [state quantity control means] |
| 8 | Hydraulic drive circuit |
| 9 | Exhaust gas control means |
| 10 | Urea aqueous solution reservoir (reducing agent solution reservoir) |
| 11 | Remaining amount detection means |
| 12 | Warning lamp (alarm means) |
| 13 | Characteristic line |
| 14 | Characteristic line |
| 15 | Characteristic line |
| 16 | Solenoid valve (delivery pressure control means) [state quantity control means] |
| 17 | Pilot pump (delivery pressure control means) [state quantity control] |
| 101 | Engine |
| 102 | Variable-displacement hydraulic pump |
| 103 | Revolution speed instructing device |
| 104 | Regulator |
| 105 | Main relief valve |
| 106 | Revolution control means |
| 107 | Controller |
| 107a | On/off signal generator unit |
| 107b | Engine revolution speed computing unit |
| 107c | Function generator unit (engine revolution speed limiting means) |
| 107d | Minimum selector unit (engine revolution speed limiting means) |
| 108 | Hydraulic drive circuit |
| 109 | Exhaust gas control means |
| 110 | Urea aqueous solution reservoir (reducing agent solution reservoir) |
| 111 | Remaining amount detection means |
| 112 | Warning lamp (alarm means) |

The invention claimed is:

1. An exhaust gas purification system for a construction machine provided with an engine, a variable displacement hydraulic pump driven by said engine and controlled such that an absorption torque does not exceed an output torque of said engine, a regulator for controlling a swash angle of said variable displacement hydraulic pump, and a hydraulic drive circuit including plural hydraulic actuators to which pressure oil delivered from said variable displacement hydraulic pump is fed, comprising:

an exhaust gas purifying device for conducting treatment to purify nitrogen oxides in exhaust gas emitted from said engine;

a reducing agent solution reservoir for storing a reducing agent solution to be fed to said exhaust gas purifying device;

a remaining amount detecting device for detecting a remaining amount of said reducing agent solution stored in said reducing agent solution reservoir;

an alarm operatively configured to provide a warning to an effect that a replenishment of said reducing agent solution is required, when said remaining amount of said reducing agent solution as detected by said remaining amount detecting device has decreased to a first predetermined amount; and a state quantity control device for performing a control to gradually decrease a state quantity relating to a drive of said variable displacement hydraulic pump to a predetermined value in a range that an operation of said hydraulic actuator becomes feasible while as said remaining amount of said reducing agent solution as detected by said remaining amount detecting device becomes smaller from said first predetermined amount to a second predetermined amount smaller than said first predetermined amount and for maintaining said state quantity within a range of said predetermined amounts in which the operation of said hydraulic actuator becomes feasible when said remaining amount of said reducing agent solution as detected by said remaining amount detecting device becomes smaller from said second predetermined amount, wherein said swash angle of said variable displacement hydraulic pump is controlled by said regulator and said variable displacement hydraulic pump is torque-controlled such that said absorption torque does not exceed said output torque of said engine in a state where said state quantity relating to said drive of said variable displacement hydraulic pump is controlled by said state quantity control device.

2. An exhaust gas purification system for a construction machine provided with an engine, a variable displacement hydraulic pump driven by said engine and controlled such that an absorption torque does not exceed an output torque of said engine, a regulator for controlling a swash angle of said variable displacement hydraulic pump, and a hydraulic drive circuit including plural hydraulic actuators to which pressure oil delivered from said variable displacement hydraulic pump is fed, comprising:

an exhaust gas purifying device for conducting treatment to purify nitrogen oxides in exhaust gas emitted from said engine, a reducing agent solution reservoir for storing a reducing agent solution to be fed to said exhaust gas purifying device, a remaining amount detecting device for detecting a remaining amount of said reducing agent solution stored in said reducing agent solution reservoir, an alarm operatively configured to provide a warning to an effect that a replenishment of said reducing agent solution is required, when said remaining amount of said reducing agent solution as detected by said remaining amount detecting device has decreased to a first predetermined amount, and an engine revolution speed limiting device means for limiting a maximum revolution speed of said engine such that, while said remaining amount of said reducing agent solution as detected by said remaining amount detecting device detection means becomes smaller from said first predetermined amount to a second predetermined amount smaller than said first predetermined amount, said maximum revolution speed is gradually reduced in accordance with the decrease in said remaining amount to a predetermined value in a range that an operation of said hydraulic actuator becomes feasible and for maintaining said maximum revolution speed of said engine within said range of said predetermined amounts in which the operation of said hydraulic actuator becomes feasible when said remaining amount of said reducing agent solution as detected by said remaining amount detecting device becomes smaller from said second predetermined amount, wherein said swash angle of said variable displacement hydraulic pump is controlled by said regulator in accordance with said revolution speed controlled by said engine revolution speed limiting device.

3. An exhaust gas purification system according to claim 1, wherein:
said state quantity relating to said drive of said variable displacement hydraulic pump is a pump absorption torque, and said state quantity control device comprises a pump absorption torque control device.

4. An exhaust gas purification system according to claim 1, wherein:
said state quantity relating to said drive of said variable displacement hydraulic pump is a flow rate delivered from said variable displacement hydraulic pump, and said state quantity control device further includes a flow rate control device means.

5. An exhaust gas purification system according to claim 1, wherein:
said state quantity relating to said drive of said variable displacement hydraulic pump is a delivery pressure of said variable displacement hydraulic pump, and said state quantity control device further includes a delivery pressure control device means.

6. An exhaust gas purification system according to claim 1, wherein said reducing agent solution comprises urea aqueous solution.

7. An exhaust gas purification system according to claim 1, wherein said alarm comprises a warning lamp.

8. An exhaust gas purification system according to claim 2, wherein said reducing agent solution comprises urea aqueous solution.

9. An exhaust gas purification system according to claim 3, wherein said reducing agent solution comprises urea aqueous solution.

10. An exhaust gas purification system according to claim 4, wherein said reducing agent solution comprises urea aqueous solution.

11. An exhaust gas purification system according to claim 5, wherein said reducing agent solution comprises urea aqueous solution.

12. An exhaust gas purification system according to claim 2, wherein said alarm comprises a warning lamp.

13. An exhaust gas purification system according to claim 3, wherein said alarm comprises a warning lamp.

14. An exhaust gas purification system according to claim 4, wherein said alarm comprises a warning lamp.

15. An exhaust gas purification system according to claim 5, wherein said alarm comprises a warning lamp.

16. An exhaust gas purification system according to claim 6, wherein said alarm device comprises a warning lamp.

* * * * *